United States Patent
Kushioka et al.

(10) Patent No.: US 9,871,542 B2
(45) Date of Patent: Jan. 16, 2018

(54) NOISE CANCELLER DEVICE

(71) Applicant: Hitachi Kokusai Electric Inc., Tokyo (JP)

(72) Inventors: Yoichi Kushioka, Tokyo (JP); Koji Yotsumoto, Tokyo (JP); Mitsuhiro Takashima, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 15/254,974

(22) Filed: Sep. 1, 2016

(65) Prior Publication Data

US 2016/0373145 A1   Dec. 22, 2016

Related U.S. Application Data

(63) Continuation of application No. PCT/JP2015/054140, filed on Feb. 16, 2015.

(30) Foreign Application Priority Data

Mar. 5, 2014 (JP) ................................ 2014-042342

(51) Int. Cl.
| | | |
|---|---|---|
| H04B 1/10 | (2006.01) | |
| H04B 7/005 | (2006.01) | |
| H04B 1/16 | (2006.01) | |

(52) U.S. Cl.
CPC ......... H04B 1/1036 (2013.01); H04B 1/1081 (2013.01); H04B 1/16 (2013.01); H04B 7/005 (2013.01)

(58) Field of Classification Search
CPC . H04B 1/10; H04B 1/16; H04B 1/709; H04B 1/7107; H04B 1/71075; H04B 7/08;
(Continued)

(56) References Cited

U.S. PATENT DOCUMENTS

| | | | | |
|---|---|---|---|---|
| 6,157,685 | A * | 12/2000 | Tanaka | H04B 1/71075 375/346 |
| 6,600,729 | B1 * | 7/2003 | Suzuki | H04B 1/71075 455/63.1 |

(Continued)

FOREIGN PATENT DOCUMENTS

| | | | |
|---|---|---|---|
| JP | 11-274984 | A | 10/1999 |
| JP | 11274984 | A * | 10/1999 |

(Continued)

OTHER PUBLICATIONS

International Search Report, dated Apr. 28, 2015, for corresponding International Application No. PCT/JP2015/054140.

*Primary Examiner* — Quochien B Vuong
(74) *Attorney, Agent, or Firm* — Myers Wolin, LLC

(57) ABSTRACT

A noise canceller device for removing interference signals from other systems and improving communication quality of a desired signal is provided. The noise canceller device comprises a first calculation unit performing cross-correlation processing on interference signals received by sub-antennas, a first peak detection unit detecting peaks of the interference signals, a first information acquisition unit acquiring first interference signal information, a composition unit composing the interference signals, a second calculation unit performing correlation processing between a signal received by a main antenna and the composed interference signal, a second peak detection unit detecting a peak of the composed interference signal, a second information acquisition unit acquiring second interference signal information, an interference signal replica generation unit generating an interference signal replica, and a removal unit subtracting the interference signal replica from the received signal by the main-antenna.

10 Claims, 13 Drawing Sheets

(58) Field of Classification Search
CPC ......... H04B 2201/709709; H04M 3/18; H94L 27/38
USPC .... 455/63.1, 67.13, 295, 296, 303; 375/346, 375/349
See application file for complete search history.

(56) References Cited

U.S. PATENT DOCUMENTS 7,809,089 B2 * 10/2010 Kuroyanagi ....... H04B 1/71055 375/343
2002/0136278 A1 9/2002 Nakamura et al.

FOREIGN PATENT DOCUMENTS

| JP | 2000-323915 A | | 11/2000 |
|---|---|---|---|
| JP | 2000323915 A | * | 11/2000 |
| JP | 2002-290275 A | | 10/2002 |
| JP | 2009-272767 A | | 11/2009 |
| JP | 2013-197775 A | | 9/2013 |

* cited by examiner

NOISE CANCELLER DEVICE

CROSS REFERENCE TO RELATED APPLICATIONS

This application is a continuation of PCT/JP2015/054140 filed Feb. 16, 2016, which takes priority from Japanese Patent Application No. 2014-042342 filed Mar. 5, 2014, the entirety of each of which are hereby incorporated by reference.

TECHNICAL FIELD

The present invention relates to noise canceller devices in radio communication systems and in particular relates to the noise canceller device capable of removing interference signals from other systems.

BACKGROUND

In a conventional radio communication system, there are cases where signals of other systems act as interference signals on a desired signal and thereby a communication environment is deteriorated.

For example, in broadcasting satellite reception equipment and so forth having a BS (Broadcasting Satellite) antenna that is installed in each home, there are many cases where it is frequency-converted in order to process a received signal, and when a radio wave leaks out of the reception equipment on that occasion, such a case that it interferes with a band of a mobile phone system.

In a case where a band of a signal that acts as the interference signal on the band of the mobile phone system that works as a desired signal is wider than the band of the mobile phone system, it becomes difficult to remove it as the interference signal by a filter and so forth. In addition, when the interference signal is a known one, it is also possible to remove it by generating a replica as a reference. However, when the replica of the interference signal cannot be prepared, it becomes difficult to remove only the interference signal.

RELATED ART

Incidentally, as related prior art, there is Japanese Patent Laid-Open Publication No. 2009-272767 "Interference Wave Canceller Relay Device" (Hitachi Kokusai Electric Inc.) [Patent Document 1].

In Patent Literature 1, it is indicated that in an interference wave canceller relay device, it is made such that updating of a filter coefficient of a complex FIR filter unit that is necessary for cancellation of a sneak wave can be performed always correctly.

PRIOR ART DOCUMENT

Patent Documents

[Patent Literature 1] Japanese Patent Laid-Open Publication No. 2009-272767

However, in the above-mentioned conventional mobile phone radio communication system, there are cases where the interference signals from other systems such as the broadcasting satellite reception equipment having the BS antenna and so forth cannot be removed, and there was such a problem that speech communication quality of the mobile phone using the desired signal is deteriorated.

In addition, in Patent Document 1, it is adapted to perform cancellation of the sneak wave and is not configured so as to remove the interference signals from other systems.

SUMMARY

The present invention has been made in view of the above-mentioned circumstances, it is an object of the present invention to provide a noise canceller device that is capable of removing the interference signals from other systems and improving the communication quality of the desired signal.

To solve the above-mentioned problems of the prior art, according to the present invention, there is provided a noise canceller device, comprising: an interference signal composition section that performs cross-correlation processing in regard to a plurality of received interference signals and acquires information on the interference signals, and composes the plurality of received interference signals on the basis of the information concerned, and outputs composed interference signal; an interference signal replica generation section that performs processing of correlation between a received signal and the composed interference signal and acquires information on the interference signal included in the received signal, and generates an interference signal replica on the basis of the information concerned; and an interference signal removal unit that removes the interference signal by subtracting the interference signal replica from the received signal, and there are advantageous effects that the interference signals from other systems can be removed and the communication quality of the desired signal can be improved.

According to the present invention, in the noise canceller device, antennas adapted to receive the interference signals plurally are installed, and the antennas are a main-antenna and one or more sub-antenna(s).

According to the present invention, in the noise canceller device, antennas adapted to receive the interference signals plurally are installed, and the antennas are a plurality of sub-antennas.

According to the present invention, in the noise canceller device, at least one of the plurality of sub-antennas is made so as to have directivity to the interference signal.

According to the present invention, there is provided a noise canceller device, comprising: an interference signal composition section that performs self-correlation processing in regard to a received signal and acquires information on a plurality of interference signals included in the received signal, and composes the plurality of interference signals included in the received signal on the basis of the information concerned, and outputs composed interference signal; an interference signal replica generation section that performs processing of correlation between the received signal and the composed interference signal and acquires information on the interference signal included in the received signal, and generates an interference signal replica on the basis of the information concerned; and an interference signal removal unit that removes the interference signal by subtracting the interference signal replica from the received signal, and there are advantageous effects that the interference signals from other systems can be removed and the communication quality of the desired signal can be improved.

According to the present invention, in the noise canceller device, a main antenna to receive signals is installed, or a main antenna and a sub-antenna to receive signals are installed.

According to the present invention, in noise canceller devices, optionally combines the plurality of noise canceller devices per band from within the above-mentioned noise canceller devices, shares pieces of information on interference signals in interference signal composition section, and uses the information that has been decided to be high in accuracy or the information that is large in received level in the pieces of acquired information on the interference signals, and there is an advantageous effect that the interference signal can be removed from the received signal with accuracy by utilizing the information on the interference signals in different bands.

Figure 1:
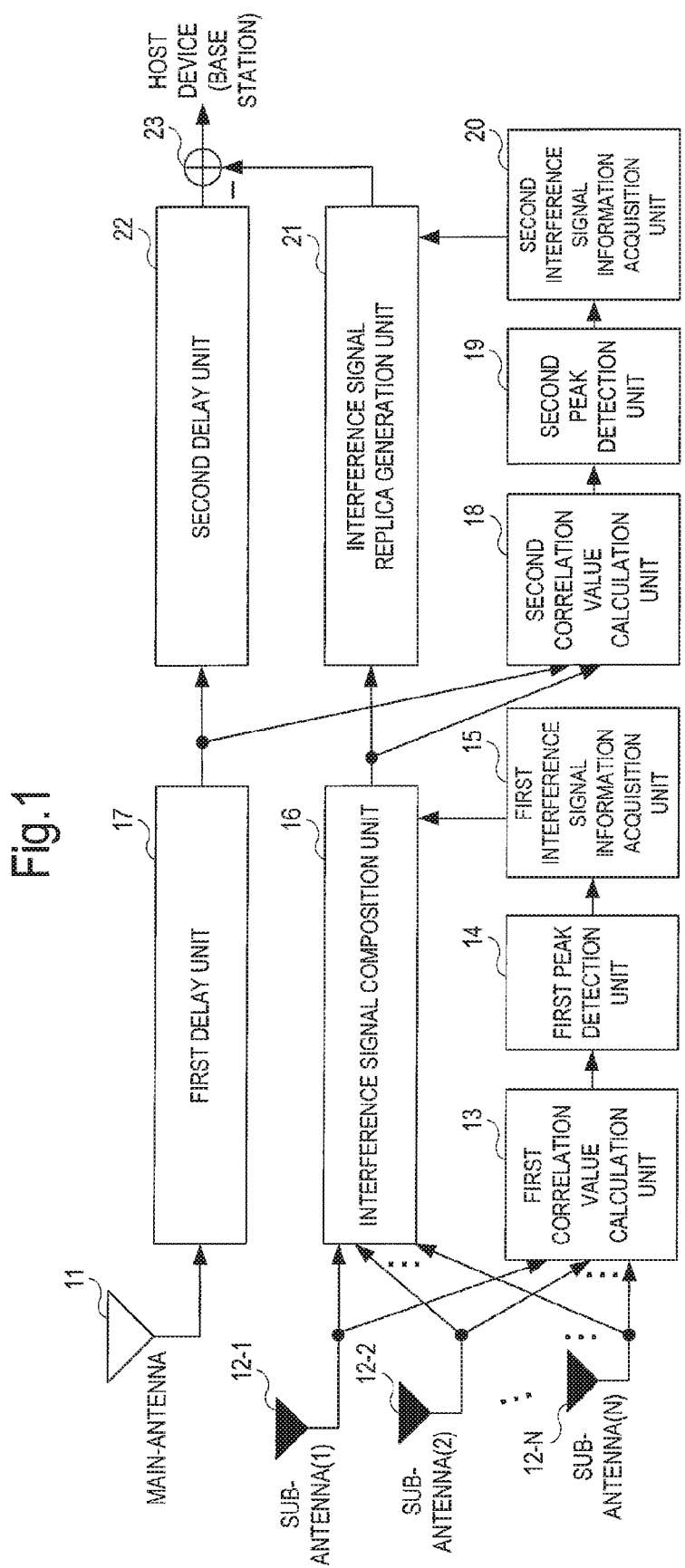
FIG. 1 is a configurational block diagram of a first noise canceller device.

DESCRIPTION OF REFERENCE NUMERALS 11, 11a, 11b . . . main-antenna,
12, 12a, 12b . . . sub-antenna,
13, 13a, 13b 131, 131a, 131b . . . first correlation value calculation unit,
14, 14a, 14b . . . first peak detection unit,
15, 15a, 15b . . . first interference signal information acquisition unit,
16, 16a, 16b 161, 161a, 161b . . . interference signal composition unit,
17, 17a, 17b . . . first delay unit,
18, 18a, 18b . . . second correlation value calculation unit,
19, 19a, 19b . . . second peak detection unit,
20, 20a, 20b . . . second interference signal information acquisition unit,
21, 21a, 21b . . . interference signal replica generation unit,
22, 22a, 22b . . . second delay unit,
23, 23a, 23b . . . interference signal removal unit

DETAILED DESCRIPTION

Embodiments of the present invention will be described with reference to the drawings.

A noise canceller device according to an embodiment of the present invention is the one that has an interference signal composition section that performs cross-correlation processing in regard to a plurality of received interference signals and acquires information on the interference signals, and composes the plurality of received interference signals on the basis of the information concerned and outputs composed interference signal, an interference signal replica generation section that performs processing of correlation between a received signal and the composed interference signal and acquires information on the interference signal included in the received signal, and generates an interference signal replica on the basis of the information concerned, and an interference signal removal unit that removes the interference signal by subtracting the interference signal replica from the received signal, and the interference signals from other systems can be removed and the communication quality of the desired signal can be improved.

In addition, since a noise canceller device according to an embodiment of the present invention is made as the one that has an interference signal composition section that performs self correlation processing in regard to a received signal and acquires information on a plurality of interference signals included in the received signal, and composes the plurality of interference signals on the basis of the information concerned and outputs composed interference signals included in the received signal, an interference signal replica generation section that performs processing of correlation between the received signal and the composed interference signal and acquires information on the interference signal included in the received signal, and generates an interference signal replica on the basis of the information concerned, and an interference signal removal unit that removes the interference signal by subtracting the interference signal replica from the received signal, the interference signals from other systems can be removed and the communication quality of the desired signal can be improved.

In addition, since a noise canceller device according to an embodiment of the present invention is made as the one that combines a plurality of noise canceller devices per band from within the above-mentioned noise canceller devices, shares pieces of information on interference signals in interference signal composition section, and uses the information that has been decided to be high in accuracy or the information that is large in received level in the pieces of acquired information on the interference signals, the interference signal can be removed from the received signal with accuracy by utilizing the information on the interference signals in different bands.

[First Noise Canceller Device: FIG. 1]

The first noise canceller device according to the embodiment of the present invention (the first noise canceller device) will be described with reference to FIG. 1. FIG. 1 is a configurational block diagram of the first noise canceller device.

The first noise canceller device has, as illustrated in FIG. 1, a main-antenna 11 and a plurality of sub-antennas 12 as antenna section, has a first correlation value calculation unit 13, a first peak detection unit 14, a first interference signal information acquisition unit 15, and an interference signal composition unit 16 as the interference signal composition section, is equipped with a first delay unit 17 that delays a signal from the main-antenna 11, has a second correlation value calculation unit 18, a second peak detection unit 19, a second interference signal information acquisition unit 20, and an interference signal replica generation unit 21 as the interference signal replica generation section, and is equipped with a second delay unit 22 that delays a signal from the first delay unit 17 and an interference signal removal unit 23.

[Respective Units of First Noise Canceller Device]

The respective units of the first noise canceller device will be specifically described.

[Main-Antenna 11]

Although the main-antenna 11 is an antenna adapted to receive the desired signal and specifically is the antenna adapted to receive a radio signal of a mobile phone system, the interference signals from other systems (leakage signals from BS antennas) are mixed into it.

[Sub-Antenna 12]

The sub-antenna 12 is an antenna adapted to receive the interference signal, and there is a plurality of ones (12-1, 12-2, . . . , 12-N) and each is connected to the first correlation value calculation unit 13 and the interference signal composition unit 16.

However, the sub-antenna 12 is not simply capable of receiving only the interference signal and also receives the desired signal and other signals. In a case where the sub-antennas have been installed plurally, an interference signal cancellation effect can be improved by performing processing for increasing the accuracy of the interference signal by using signals that have been received plurally.

Since the respective sub-antennas 12 receive the interference signals from some interference sources, the signals from the respective interference sources are received in a state where they are made different from one another in received level, delay and so forth by varying positions and angles of the plurality of sub-antennas 12.

[First Correlation Value Calculation Unit 13]

The first correlation value calculation unit 13 inputs therein the signals from all of the sub-antennas 12, varies the delay and the frequency among signals in regard to respective input signals and calculates a correlation value among the input signals input from all of the sub-antennas 12. Correlation processing in the first correlation value calculation unit 13 is processing of cross-correlation.

[First Peak Detection Unit 14]

The first peak detection unit 14 detects peaks in regard to the input signals from all of the sub-antennas 12 on the basis of the correlation value calculated by the first correlation value calculation unit 13, and detects the interference signals in the sub-antennas 12.

[First Interference Signal Information Acquisition Unit 15]

The first interference signal information acquisition unit 15 acquires information on delay times (timing information), phases, signals levels and so forth of the interference signals detected by the first peak detection unit 14 as interference signal information (first interference signal information), and outputs it to the interference signal composition unit 16. In a case where the peaks are not detected by the peak detection unit 14, the signal levels of the signals input through the sub-antennas 12 are measured and an instruction for selecting the sub-antenna 12 that has received the input signal that is the largest in signal level is output to the interference signal composition unit 16.

[Interference Signal Composition Unit 16]

When the first interference signal information is input from the first interference signal information acquisition unit 15, the interference signal composition unit 16 composes the interference signals in the sub-antennas 12, by mutually matching the phases and the timings of the interference signals that have been input from the respective sub-antennas, on the basis of the first information and outputs it to the second correlation value calculation unit 18 and the interference signal replica generation unit 21.

In addition, when the instruction for selecting one of the sub-antenna 12 is input, the interference signal composition unit 16 does not perform composition processing of the interference signals and outputs the signal received by the selected sub-antenna 12 to the second correlation value calculation unit 18 and the interference signal replica generation unit 21.

[First Delay Unit 17]

The first delay unit 17 delays the desired signal from the main-antenna 11, taking the processing in the interference signal composition unit 16 into consideration, and outputs it to the second correlation value calculation unit 18 and the second delay unit 22.

That is, the first delay unit 17 performs a delaying operation so as to coincide with an output timing of the interference signal composition unit 16.

[Second Correlation Value Calculation Unit 18]

The second correlation value calculation unit 18 inputs therein the desired signal from the first delay unit 17 and the composed interference signal (or the interference signal [the interference signal that is the largest in signal level] received by the selected sub-antenna 12) from the interference signal composition unit 16, performs correlation processing by varying the delays and the frequencies of those signals, and calculates a correlation value between the signal received by the main-antenna and the composed interference signal (or the interference signal that is the largest in signal level).

[Second Peak Detection Unit 19]

The second peak detection unit 19 detects the peaks of input signals on the basis of the correlation value calculated by the second correlation value calculation unit 18, and detects the interference signal from the received signal of the main-antenna 11.

[Second Interference Signal Information Acquisition Unit 20]

The second interference signal information acquisition unit 20 acquires the information on the delay times (the timing information), the phases, the signal levels and so forth of the interference signals detected by the second peak detection unit 19 as the interference signal information (second interference signal information), and outputs it to the interference signal replica generation unit 21.

[Interference Signal Replica Generation Unit 21]

The interference signal replica generation unit 21 generates a replica of the interference signals on the basis of the second interference signal information input from the second interference signal information acquisition unit 20, and outputs it to the interference signal removal unit 23.

Since the interference signals are radio waves that have leaked out of pieces of the broadcasting satellite reception equipment having the BS antenna, the components of the respective interference signals are the same as one another originally even when the interference sources thereof are different from one another. Therefore, if the signal from one interference source is reproduced as the replica in accordance with the interference signal information by the interference signal replica generation unit 21, also a replica of the interference signal of another interference source can be reproduced.

[Second Delay Unit 22]

The second delay unit 22 delays the desired signal from the first delay unit 17, taking processing in the interference signal replica generation unit 21 into consideration, and outputs it to the interference signal removal unit 23.

That is, the second delay unit 22 performs the delaying operation so as to coincide with an output timing of the interference signal replica generation unit 21.

[Interference Signal Removal Unit 23]

The interference signal removal unit 23 subtracts (deducts) the signal (the replica of the interference signals) output from the interference signal replica generation unit 21 from the signal output from the second delay unit 22, that is, removes the replica of the interference signals from the received signal of the main-antenna 11 and takes out the desired signal, and outputs it to a host device (for example, a base station).

[Noise Cancellation Method]

Next, a noise cancellation method in the first noise canceller device will be described with reference to FIG. 1 to FIG. 6.

Figure 2:
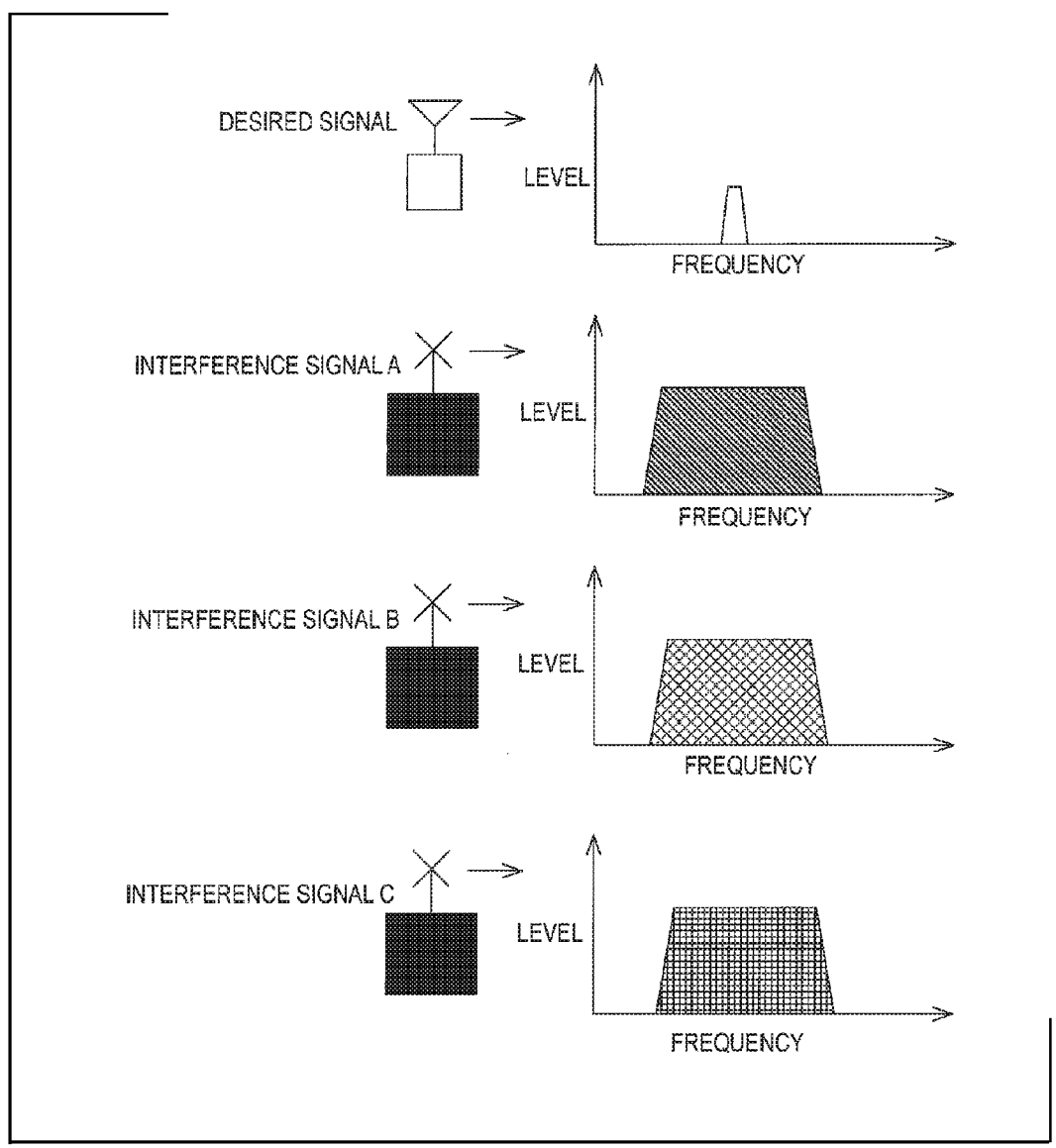
FIG. 2 is a diagram illustrating a desired signal and interference signals.

[Desired Signal and Interference Signals: FIG. 2]

First, the desired signal and the interference signals will be described with reference to FIG. 2. FIG. 2 is a diagram illustrating the desired signal and the interference signals. FIG. 2 illustrates a state where the interference signals are leaking out of pieces of the broadcasting satellite receiving equipment having the BS antenna.

As illustrated in FIG. 2, a case where there are three interference sources for the desired signal is illustrated. Although all of an interference signal A, an interference signal B, and an interference signal C are the same as one another in component, they are different from one another in delay, phase, frequency and so forth.

Figure 3:
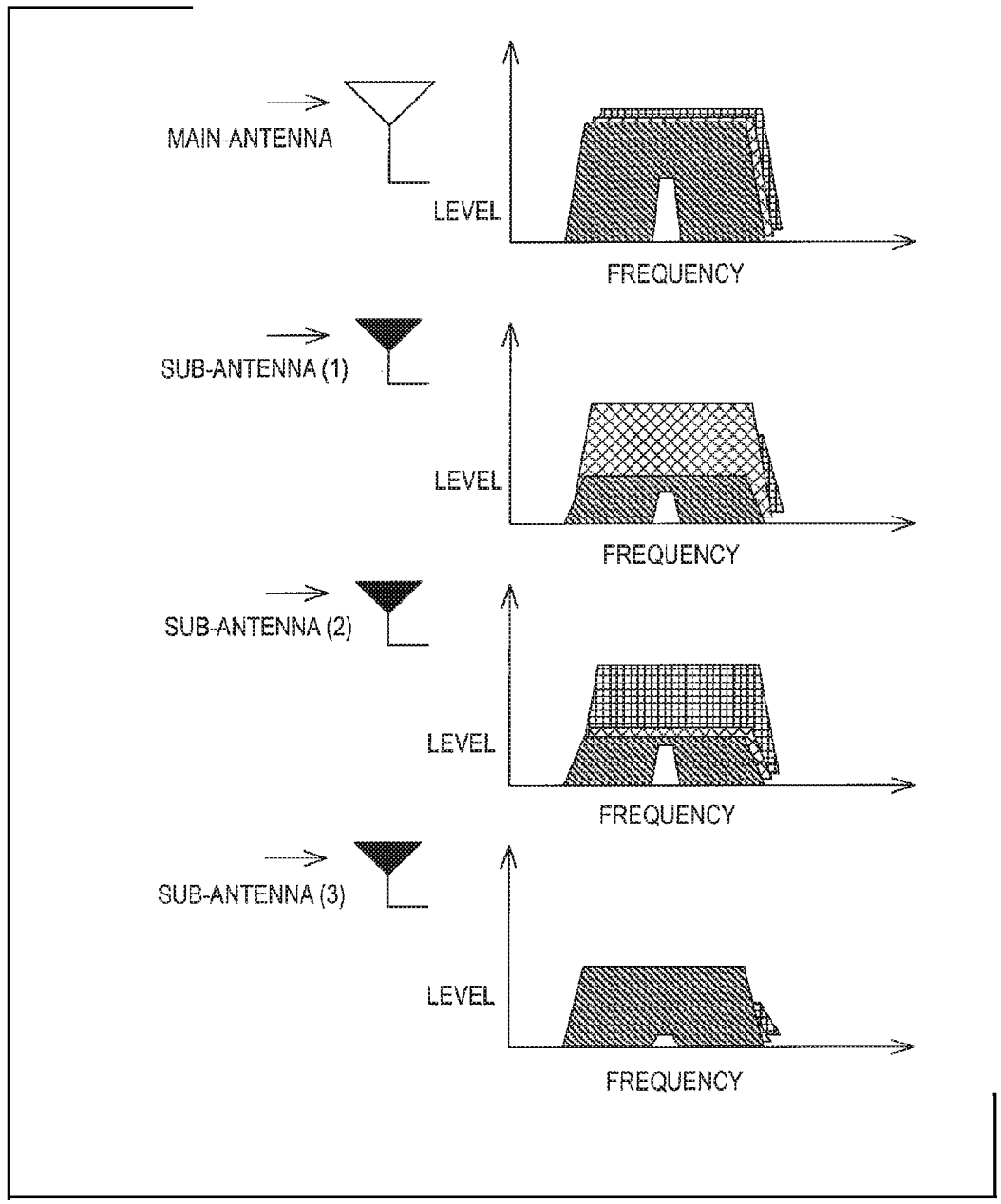
FIG. 3 is a diagram illustrating received signals of respective antennas.

[Received Signals of Respective Antennas: FIG. 3]

A state where the desired signal and the interference signals illustrated in FIG. 2 have been received by the respective antennas is illustrated in FIG. 3. FIG. 3 is a diagram illustrating received signals of the respective antennas.

As illustrated in FIG. 3, although the main-antenna and the sub-antennas (1) to (3) receive the desired signal, and the interference signals A to C, the received levels, the delay times and so forth of the signals received by the respective antennas are different from one another. Incidentally, the interference signal B is strongly received by the sub-antenna (1), the interference signal C is strongly received by the sub-antenna (2) and the interference signal A is strongly received by the sub-antenna (3).

Then, the first correlation value calculation unit 13 inputs therein the signals received by the sub-antenna (1) 12-1, the sub-antenna (2) 12-2, the sub-antenna (3) 12-3, arithmetically operates the cross-correlation among the signals received by the respective sub-antennas, calculates the correlation value and outputs it to the first peak detection unit 14.

The first peak detection unit 14 detects the peaks of the signals received by the sub-antennas 12 from the correlation value that has been arithmetically operated by the first correlation value calculation unit 13 and detects the interference signals.

Then, the first interference signal information acquisition unit 15 acquires the information (the first interference signal information) on the timings and the phases, the received levels of the interference signals from the peak information of the interference signals and outputs it to the interference signal composition unit 16. In a case where the information on the interference signals is not obtained, it outputs an instruction for selecting the sub-antenna 12 that is the largest in received level to the interference signal composition unit 16.

The interference signal composition unit 16 composes the signals input from the respective antennas 12 so as to mutually match the phases and the timings of the interference signals on the basis of the first interference signal information from the first interference signal information acquisition unit 15 and generates a composite signal of the interference signals.

In addition, in case of the instruction for selecting the sub-antenna 12 that is the largest in received level, the interference signal composition unit 16 outputs the received signal (the interference signal that is the largest in signal level) of that sub-antenna 12 to the second correlation value calculation unit 18 and the interference signal replica generation unit 21.

Incidentally, the interference signal composite signal or the interference signal that is the largest in signal level will be referred to as the "interference signal composite signal and so forth".

Figure 4:
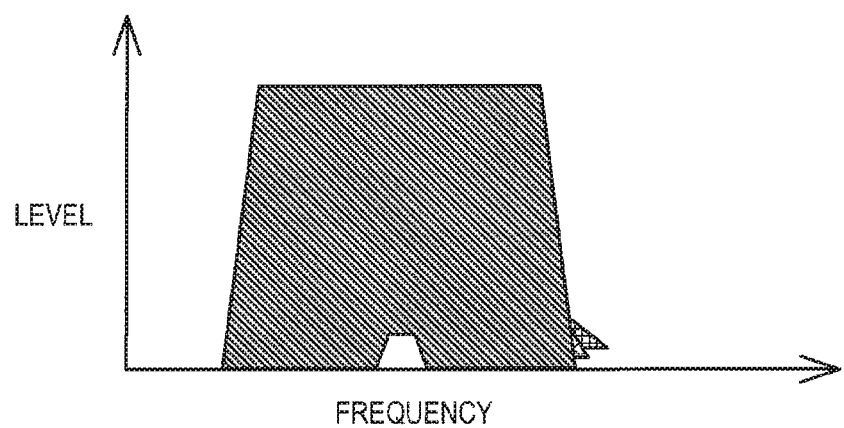
FIG. 4 is a diagram illustrating a signal after interference signal composition.

[Signal after Composition of Interference Signals: FIG. 4]

A signal after composition of the interference signals in the interference signal composition unit 16 will be described with reference to FIG. 4. FIG. 4 is a diagram illustrating the signal after composition of the interference signals.

As illustrated in FIG. 4, in a case where they have been composed on the basis of the first interference signal information, the signal from one interference source is emphasized. Although in the example in FIG. 4, the interference signal A is emphasized, also the interference signals B, C are included.

The second correlation value calculation unit 18 inputs therein the signal (the signal received by the main-antenna 11) from the first delay unit 17 and the signal (the interference signal composite signal and so forth) from the interference signal composition unit 16, arithmetically operates the correlation value thereof and calculates the correlation value, and outputs the correlation value to the second peak detection unit 19.

The second peak detection unit 19 detects the peak of the interference signal in the main-antenna 11 on the basis of the correlation value from the second correlation value calculation unit 18 and outputs information on the peak to the second interference signal information acquisition unit 20.

The second interference signal information acquisition unit 20 acquires the information (the second interference signal information) on the timings and the phases, the received levels of the interference signals from the peak information of the interference signals and outputs it to the interference signal replica generation unit 21.

The interference signal replica generation unit 21 generates a replica signal of the interference signals A, B, C on the basis of the second interference signal information from the second interference signal information acquisition unit 20, with the timing and the phase of the interference signal of the main-antenna 11, using the interference signal composite signal and so forth from the interference signal composition unit 16, and outputs it to the interference signal removal unit 23.

Figure 5:
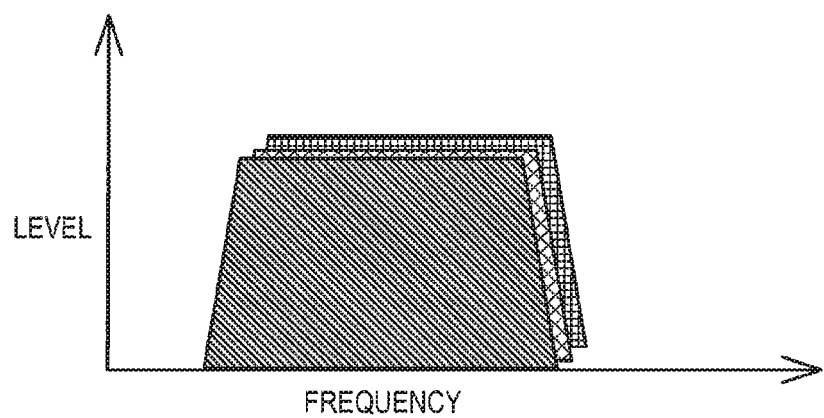
FIG. 5 is a diagram illustrating a generated replica signal.

[Replica Signal: FIG. 5]

An example of the replica signal will be described with reference to FIG. 5. FIG. 5 is a diagram illustrating the generated replica signal.

As illustrated in FIG. 5, the replica signal of the interference signals A, B, C is generated.

Since the components of the respective interference signals are the same as one another originally even when the interference sources thereof are different from another, if the signal of one interference source can be reproduced with accuracy, it will become possible to reproduce also the signal of another interference source.

Then, the interference signal removal unit 23 subtracts (deducts) the replica signal output from the interference signal replica generation unit 21 from the signal (the received signal in the main-antenna 11) output from the second delay unit 22, removes the interference signal from the received signal of the main-antenna 11, takes out the desired signal and outputs it to the host device.

Figure 6:
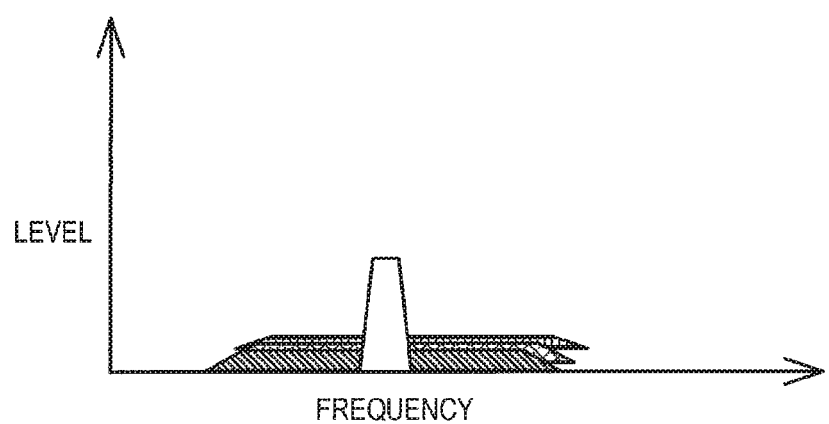
FIG. 6 is a diagram illustrating a signal after interference signal cancellation.

[Signal after Interference Signal Cancellation: FIG. 6]

The signal after cancellation of the interference signal will be described with reference to FIG. 6. FIG. 6 is a diagram illustrating the signal after cancellation of the interference signal.

As illustrated in FIG. 6, only the interference signal is removed from the received signal of the main-antenna 11 by using the replica signal and the interference signal can be taken away, leaving the desired signal as it is.

Incidentally, although in FIG. 6, the interference signal remains a little, only the central desired signal will remain ideally.

[Advantageous Effect of First Noise Canceller Device]

According to the first noise canceller device, there is an advantageous effect that the cross-correlation processing is performed in regard to the interference signals received by the plurality of sub-antennas 12 by the first correlation value calculation unit 13 and the correlation value is calculated, the peaks of the interference signals are detected from the correlation value by the first peak detection unit 14, the first interference signal information is acquired by the first interference signal information acquisition unit 15 in accordance with the peaks, the interference signals are composed by the interference signal composition unit 16 on the basis of the first interference signal information, the correlation processing between the signal received by the main-antenna 11 and the composed interference signal is performed by the second correlation value calculation unit 18 and the correlation value is calculated, the second peak detection unit 19 detects the peaks from the correlation value, the second interference signal information is acquired from the peaks by the second interference signal information acquisition unit 20, the interference signal replica is generated by the interference signal replica generation unit 21 in accordance with the second interference signal information, the interference signal replica is subtracted from the signal received by the main-antenna 11 by the interference signal removal unit 23 and thereby the interference signal can be removed.

Figure 7:
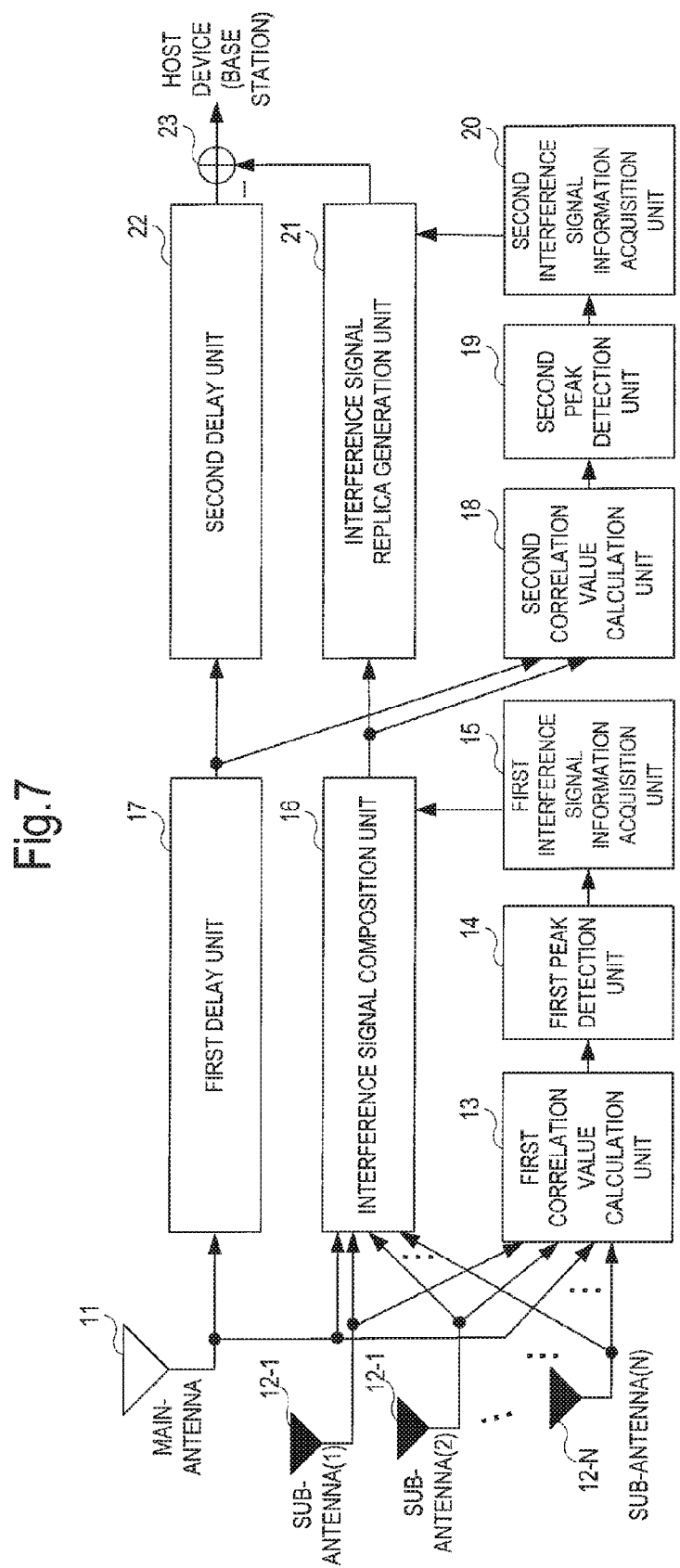
FIG. 7 is a configurational block diagram of a second noise canceller device.

[Second Noise Canceller Device: FIG. 7]

Next, the second noise canceller device according to the embodiment of the present invention (the second noise canceller device) will be described with reference to FIG. 7. FIG. 7 is a configurational block diagram of the second noise canceller device.

As illustrated in FIG. 7, although the second noise canceller device is basically the same as the first noise canceller device in FIG. 1, it is different from the first noise canceller device in the point that it has been made so as to input the interference signals not only from the sub-antennas 12 but also from the main-antenna 11.

Accordingly, in the second noise canceller device, the signal received by the main-antenna 11 is input not only into the first delay unit 17 but also into the first correlation value calculation unit 13 and the interference signal composition unit 16.

The first correlation value calculation unit 13 arithmetically operates cross-correlation in regard to the signals received by the sub-antennas 12 and the main-antenna 11 and calculates the correlation value.

In addition, the interference signal composition unit 16 performs composition of the interference signals in regard to the signals received by the sub-antennas 12 and the main-antenna 11 on the basis of the first interference signal information from the first interference signal information acquisition unit 15.

[Advantageous Effect of Second Noise Canceller Device]

According to the second noise canceller device, since it is made such that the interference signals are composed by using the interference signals received not only by the sub-antennas 12 but also by the main-antenna 11, the replica of the interference signals is generated and the interference signal is removed from the signal received by the main-antenna 11, there is such an advantageous effect that removal of the interference signal can be performed more accurately than that by the first noise canceller device.

In addition, it is effective in a case where the number of the sub-antennas 12 is small, and it may be a configuration of one main-antenna 11 and one sub-antenna 12 in FIG. 7.

Figure 8:
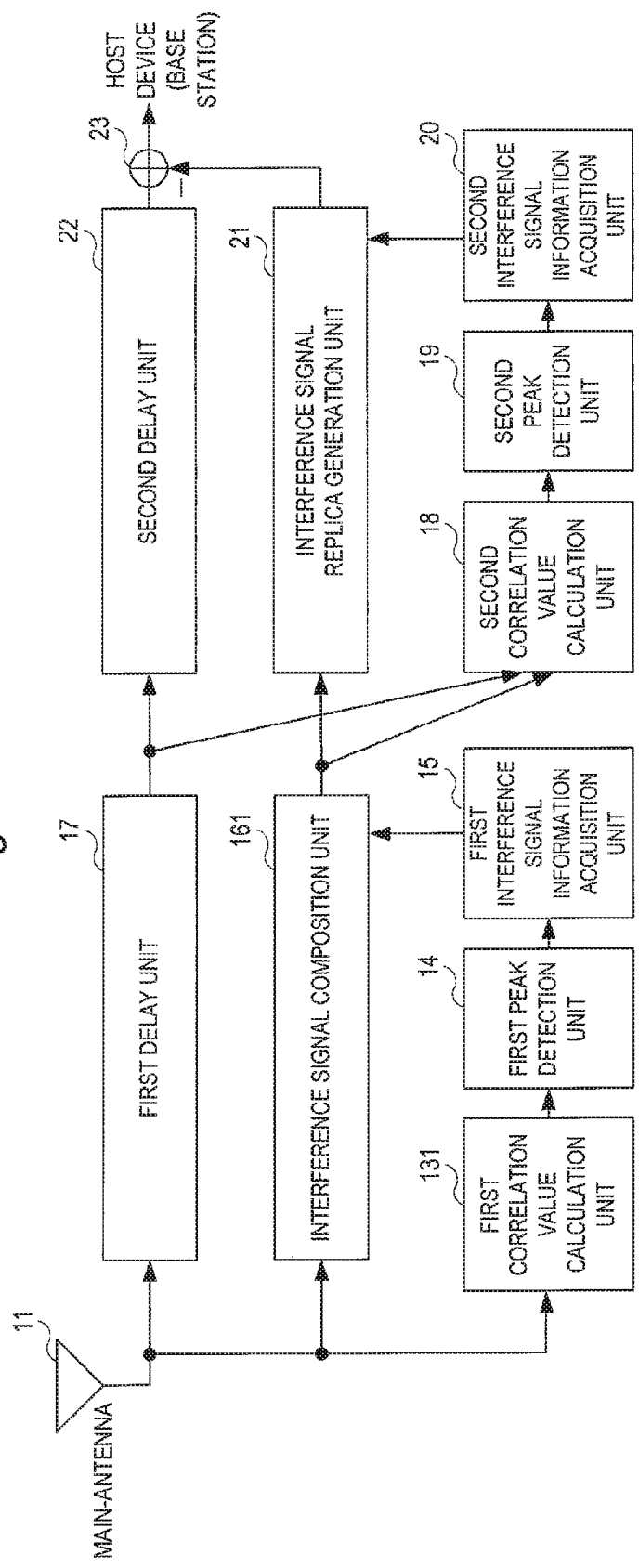
FIG. 8 is a configurational block diagram of a third noise canceller device.

[Third Noise Canceller Device: FIG. 8]

Next, the third noise canceller device according to the embodiment of the present invention (the third noise canceller device) will be described with reference to FIG. 8. FIG. 8 is a configurational block diagram of the third noise canceller device.

As illustrated in FIG. 8, the third noise canceller device is of a configuration that there is no sub-antenna 12 in comparison with the first noise canceller device in FIG. 1.

In addition, processing operations of a first correlation value calculation unit 131 and an interference signal composition unit 161 are different from those in the first noise canceller device. Other configurations are the same as those of the first noise canceller device.

Since the third noise canceller device is not equipped with the sub-antenna 12, the signals received by the main-antenna 11 are input into the first delay unit 17 and the interference signal composition unit 161 and the first correlation value calculation unit 131.

The first correlation value calculation unit 131 performs correlation processing in regard to the signals received by the main-antenna 11 while shifting the timings and the phases thereof and calculates the correlation value. The correlation processing in the first correlation value calculation unit 131 is processing of self correlation.

Processing operation of the first peak detection unit 14 and the first interference signal information acquisition unit 15 is the same as the processing operation in the first noise canceller device.

The interference signal composition unit 161 composes the interference signals in regard to the signals received by the main-antenna 11 by adjusting the timings and the phases on the basis of the first interference signal information from the first interference signal information acquisition unit 15.

Other units perform the processing operation that is the same as that in the first noise canceller device.

[Advantageous Effect of Third Noise Canceller Device]

Since according to the third noise canceller device, it is made such that the self correlation processing is performed in regard to the signals received by one main-antenna 11, peak detection is performed and the interference signals are composed, the interference signal replica is generated, and the interference signal is removed from the signal received by the main-antenna 11, there is such an advantageous effect that the interference signals can be removed only by using one main-antenna 11.

Although the third noise canceller device is not equipped with the sub-antennas and therefore the configuration can be simplified, the first and second noise canceller devices are higher in accuracy of noise removal.

Figure 9:
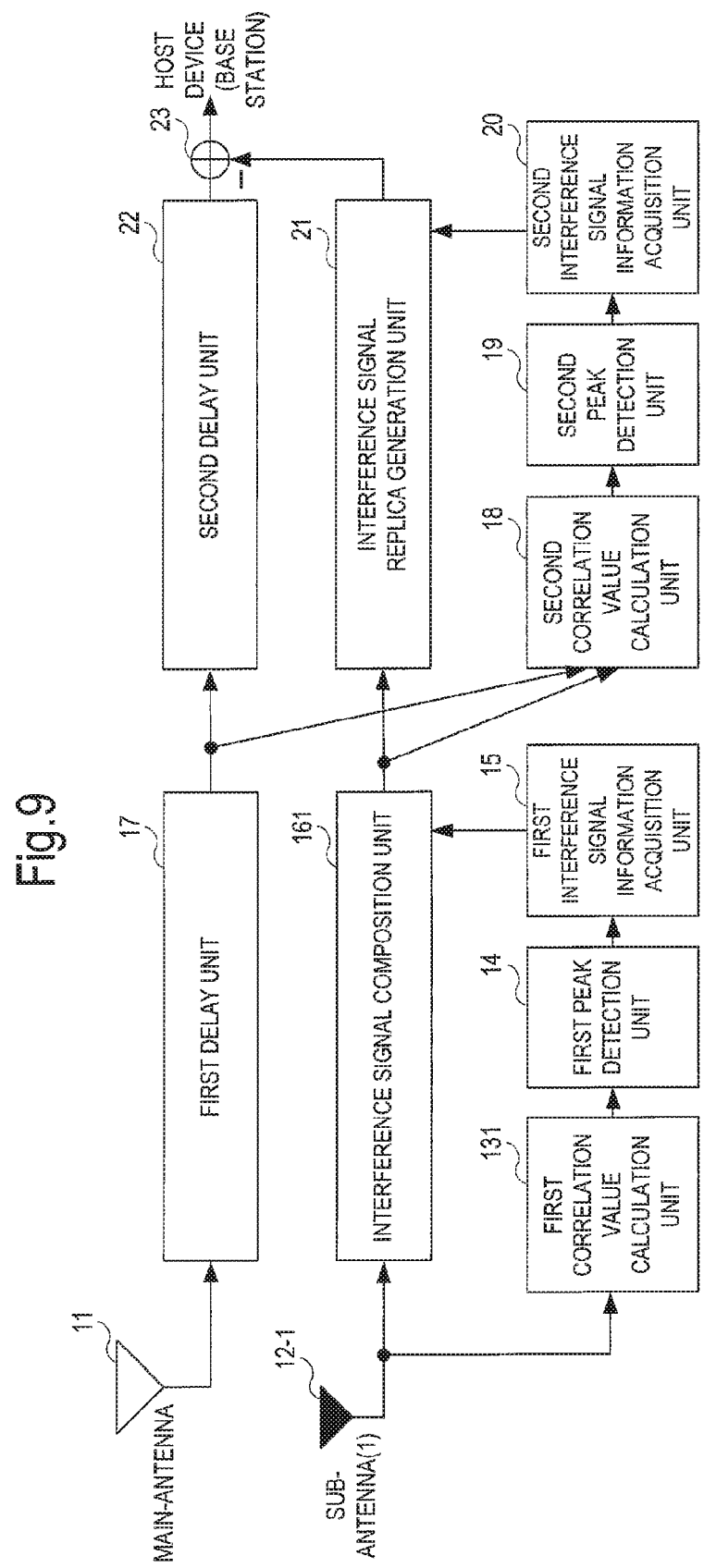
FIG. 9 is a configurational block diagram of a fourth noise canceller device.

[Fourth Noise Canceller Device: FIG. 9]

Next, the fourth noise canceller device according to the embodiment of the present invention (the fourth noise canceller device) will be described with reference to FIG. 9. FIG. 9 is a configurational block diagram of the fourth noise canceller device.

As illustrated in FIG. 9, the fourth noise canceller device is equipped with the main-antenna 11 and one sub-antenna (1) 12-1, the received signal by the main-antenna 11 is input into the first delay unit 17, the signals received by the sub-antenna (1) 12-1 are input into the first correlation value calculation unit 131 and the interference signal composition unit 161.

The first correlation value calculation unit 131 performs the self correlation processing in regard to the signals received by the sub-antenna (1) 12-1. The processing operation of the first correlation value calculation unit 131 in the fourth noise canceller device is the same as that in the third noise canceller device.

In addition, the interference signal composition unit 161 composes the interference signals on the basis of the information on the plurality of interference signals included in the received signals obtained from the first interference signal information acquisition unit 15 in regard to the signals received by the sub-antenna (1) 12-1. The processing operation of the interference signal composition unit 161 in the fourth noise canceller device is the same as that in the third noise canceller device.

Further, other configurations are the same as those of the first noise canceller device.

[Advantageous Effect of Fourth Noise Canceller Device]

Since the fourth noise canceller device is made so as to perform the self correlation processing in regard to the signals received by one sub-antenna (1) 12-1, to perform peak detection and to compose the interference signals, to generate the interference signal replica and to remove the interference signal from the signal received by the main-antenna 11, there is such an advantageous effect that the interference signal can be removed only by using one sub-antenna (1) 12-1.

Further, the fourth noise canceller device is the one that one sub-antenna (1) 12-1 is installed in addition to the main-antenna 11 and therefore the configuration can be simplified, it is higher in accuracy of noise removal than the third noise canceller device.

Figure 10:
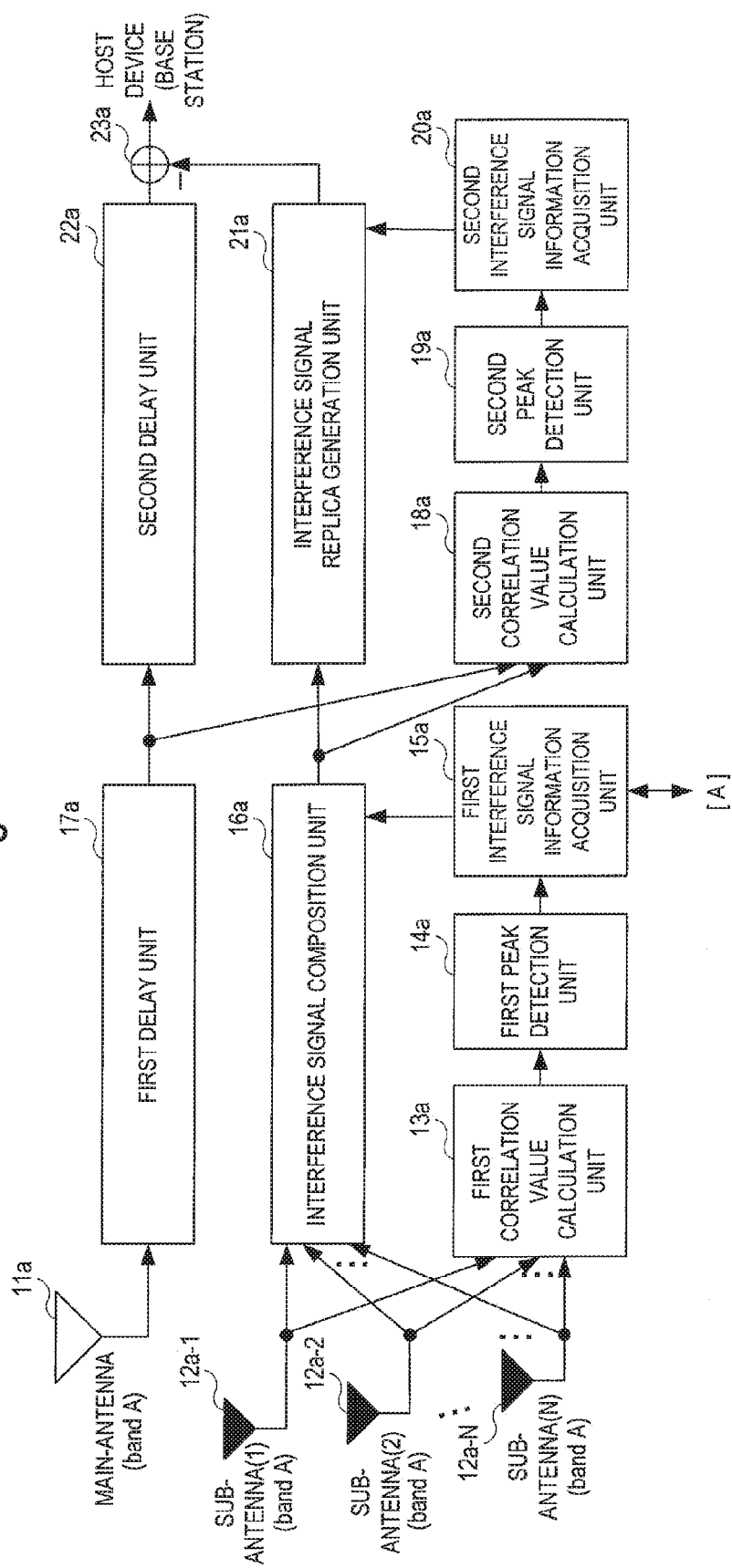
FIG. 10 is a configurational block diagram of a fifth noise canceller device (for a band A).
Figure 11:
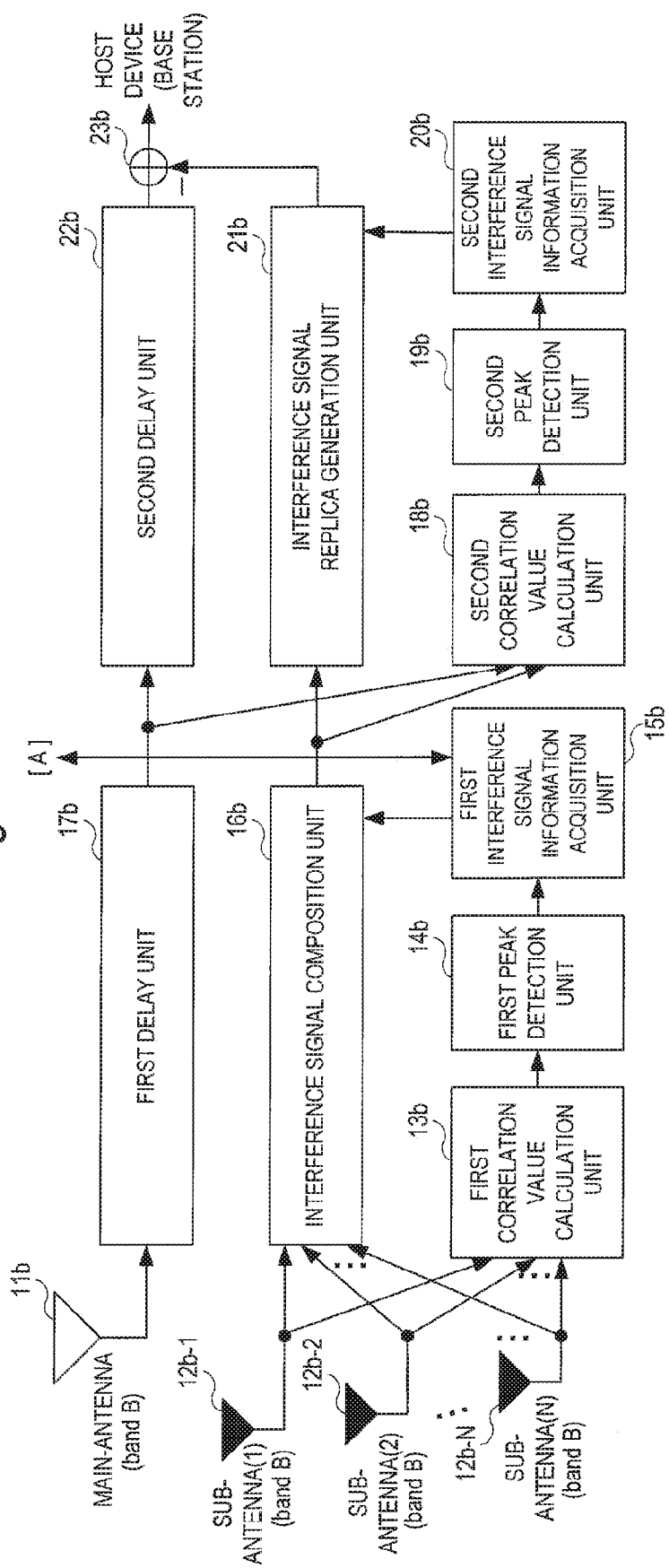
FIG. 11 is a configurational block diagram of the fifth noise canceller device (for a band B).

[Fifth Noise Canceller Device: FIGS. 10, 11]

Next, the fifth noise canceller device according to the embodiment of the present invention (the fifth noise canceller device) will be described with reference to FIGS. 10, 11. FIG. 10 is a configurational block diagram of the fifth noise canceller device (for a band A), and FIG. 11 is a configurational block diagram of the fifth noise canceller device (for a band B).

The fifth noise canceller device is the one that the configuration in FIG. 10 has been combined with the configuration in FIG. 11, and a first interference signal information acquisition unit 15a in FIG. 10 cooperates with a first interference signal information acquisition unit 15b in FIG. 11.

Incidentally, a part [A] in FIG. 10 is connected with a part [A] in FIG. 11.

Specifically, the noise canceller device in FIG. 10 is for use in the band A (a specific frequency band A: for example, a 1.5-GHz band) and the noise canceller device in FIG. 11 is for use in the band B (a specific frequency band B: for example, a 2.0-GHz band).

The basic configurations and operations of the respective noise canceller devices in FIG. 10 and FIG. 11 are the same as those of the first noise canceller device in FIG. 1.

However, processing operations of the first interference signal information acquisition unit 15a and the first interference signal information acquisition unit 15b are different from that in the first noise canceller device.

The first interference signal information acquisition unit 15a outputs interference signal information (a) (first interference signal information (a)) to the first interference signal information acquisition unit 15b.

In addition, the first interference signal information acquisition unit 15a inputs therein interference signal information (b) (first interference signal information (b)) from the first interference signal information acquisition unit 15b.

Then, the first interference signal information acquisition unit 15a refers to the interference signal information (a) acquired on the basis of the peaks detected by a first peak detection unit 14a and the interference signal information (b) input from the first interference signal information acquisition unit 15b, and in a case where they are the same as each other in timing, outputs the information that has been decided to be high in accuracy to an interference signal composition unit 16a.

The interference signal composition unit 16a composes the interference signals in accordance with the above-mentioned information.

Likewise, the first interference signal information acquisition unit 15b outputs the interference signal information (b) to the first interference signal information acquisition unit 15a, and inputs therein the interference signal information (a) from the first interference signal information acquisition unit 15a.

Then, the first interference signal information acquisition unit 15b arithmetically operates an average between the interference signal information (b) acquired on the basis of the peaks detected by the first peak detection unit 14b and the interference signal information (a) input from the first interference signal information acquisition unit 15a and outputs information on an average value thereof to an interference signal composition unit 16b.

The interference signal composition unit 16b composes the interference signals in accordance with the above-mentioned average value information.

In the first interference signal information acquisition units 15a, 15b in the fifth noise canceller device, they may be also made so as to compare pieces of the interference signal information (a), (b) with each other, to select the one that is larger in received level when the received levels of the interference signals are at least a specific threshold value, and to output and the selected interference signal information to the interference signal composition units 16a, 16b.

In addition, the first interference signal information acquisition units 15a, 15b in the fifth noise canceller device may be also made so as to decide whether the received levels in pieces of the interference signal information are at least the specific threshold value, to select the interference signal information that is large in received level in a case where they are at least the threshold value concerned, and to output the information that has been decided to be high in accuracy to the interference signal composition units 16a, 16b in a case where the interference signals are the same as each other in timing in a case where they are less than the threshold value concerned.

[Advantageous Effect of Fifth Noise Canceller Device]

According to the fifth noise canceller device, since it is made such that in a case where the interference signals are, a plurality of channels spreads in a broadband like BS signals, sub-antennas 12a, 12b that receive signals in the different bands (the bands A, B) are installed, respective pieces of the interference signal information are acquired by the first interference signal information acquisition units 15a, 15b, and are provided to the first interference signal information acquisition units 15b, 15a in the other band, and in a case where they are at the same timing, the composition of the interference signals is performed by the interference signal composition units 16a, 16b by using the interference signal information that has been decided to be high in accuracy and using the interference signal information that is large in received level, there is such an advantageous effect that the interference signals can be removed from the received signals in main-antennas 11a, 11b with accuracy by utilizing pieces of the interference signal information in the different bands.

That is, in the fifth noise canceller device, pieces of the interference signal information in the different bands are shared and utilized in composition of the interference signals.

Incidentally, although the fifth noise canceller device is made as the one that the first noise canceller devices are combined together, the fifth noise canceller device may be configured by optionally selecting and combining together the ones in the first to fourth noise canceller devices.

That is, the fifth noise canceller device may be configured by combining together the first and first ones, the first and second ones, the first and third ones, the first and fourth ones, the second and second ones, the second and third ones, the second and fourth ones, the third and third ones, the third and fourth ones, the fourth and fourth noise canceller devices.

Figure 12:
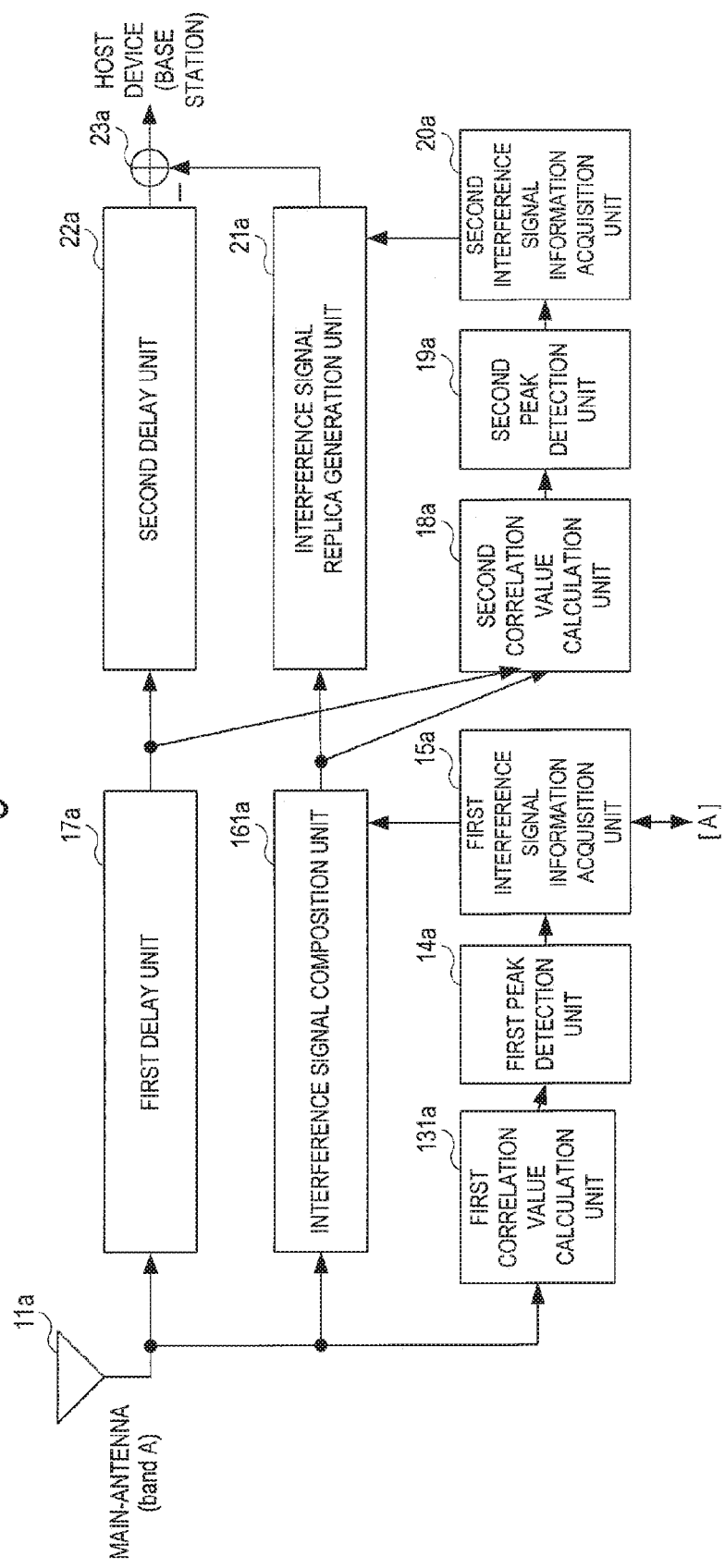
FIG. 12 is another configurational block diagram of the fifth noise canceller device (for the band A).
Figure 13:
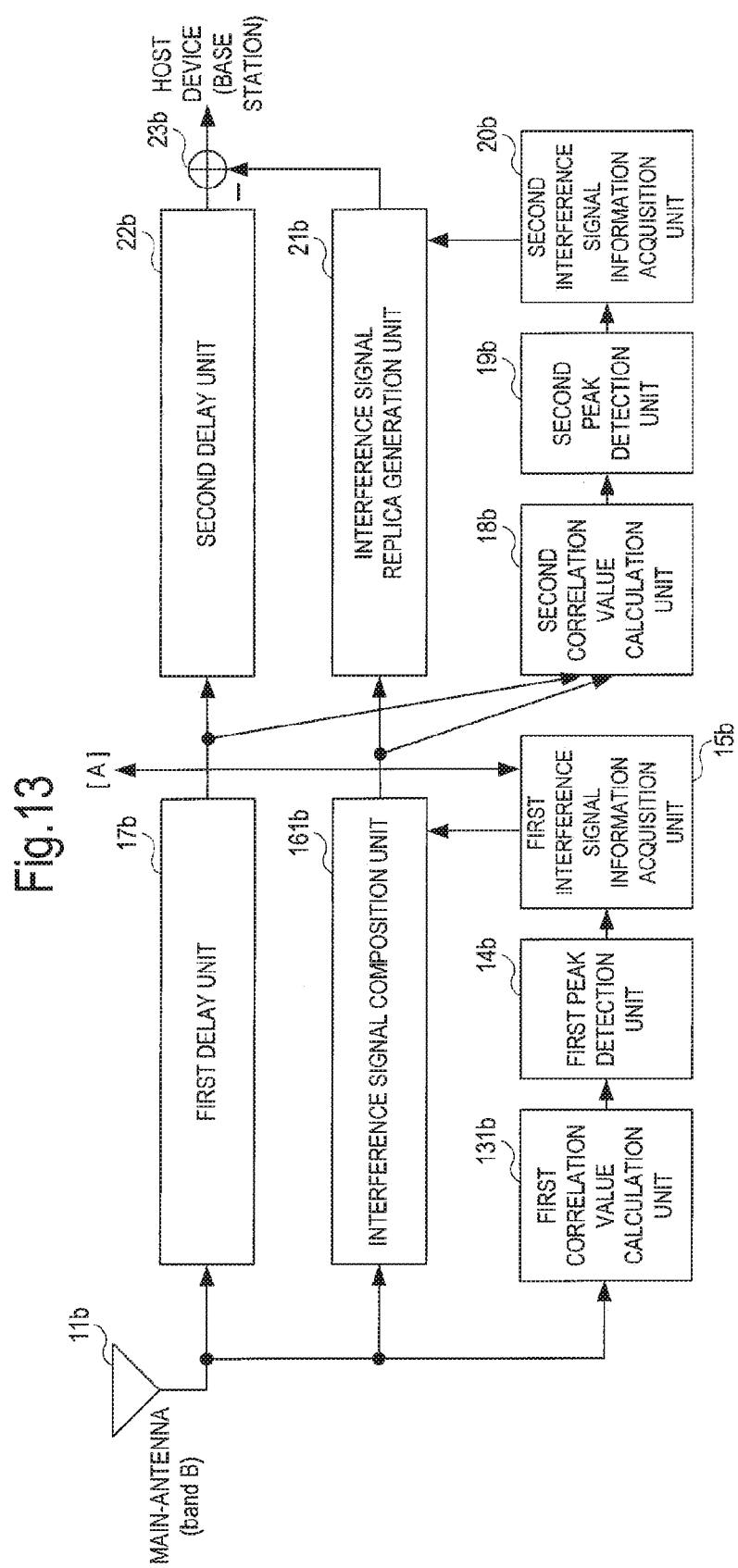
FIG. 13 is another configurational block diagram of the fifth noise canceller device (for the band B).

[Another Configuration of Fifth Noise Canceller Device: FIGS. 12, 13]

The fifth noise canceller device that the two third noise canceller devices have been combined together will be described with reference to FIGS. 12, 13. FIG. 12 is another configurational block diagram of the fifth noise canceller device (for the band A), and FIG. 13 is another configurational block diagram of the fifth noise canceller device (for the band B).

The first interference signal information acquisition unit 15a in FIG. 12 cooperates with the first interference signal information acquisition unit 15b in FIG. 13. Incidentally, the part [A] in FIG. 12 is connected with the part [A] in FIG. 13. The operations of the first interference signal information acquisition unit 15a and the first interference signal information acquisition unit 15b are the same as those described in FIGS. 10, 11.

In addition, the first noise canceller device in FIG. 10 may be combined with the third noise canceller device in FIG. 13, and the third noise canceller device in FIG. 12 may be combined with the first noise canceller device in FIG. 11.

Application Example: Directivity of Sub-Antenna

Next, the application example of the present embodiment will be described.

The sub-antenna is provided in them other than the third noise canceller device, and there are such advantageous effects that the interference signals can be received with accuracy and the cancellation effect can be improved by imparting directivity to the sub-antenna and directing the directivity toward a specific interference source.

[Advantageous Effect of Embodiment]

According to the embodiment of the present invention, since the noise canceller device is made so as to perform the processing of cross-correlation in regard to the plurality of received interference signals and to acquire the information on the interference signals, to compose the plurality of received interference signals on the basis of the information concerned, and output the composed interference signal to perform the processing of correlation between the received signal and the composed interference signal and to acquire the information on the interference signals included in the received signals, to generate the interference signal replica on the basis of the information concerned, and to subtract the interference signal replica from the received signal and to remove the interference signal, there are such advantageous effects that the interference signals from other systems can be removed and the communication quality of the desired signal can be improved.

According to the embodiment of the present invention, since the noise canceller device is made so as to perform the self correlation processing in regard to the received signal and to acquire the information on the plurality of interference signals included in the received signal, to compose the plurality of interference signals included in the received signal on the basis of the information concerned, and output the composed interference signal to perform the processing of correlation between the received signal and the composed interference signal and to acquire the information on the interference signals included in the received signal, to generate the interference signal replica on the basis of the information concerned, and to subtract the interference signal replica from the received signal and to remove the interference signal, there are such advantageous effects that the interference signals from other systems can be removed and the communication quality of the desired signal can be improved.

According to the embodiment of the present invention, since the noise canceller device is made so as to optionally combine together the plurality of noise canceller devices per band from within the above-mentioned noise canceller devices, to share the information on the interference signals used when composing the interference signals, and to use the information that has been decided to be high in accuracy or the information that is large in received level in pieces of the acquired information on the interference signal, there is such an advantageous effect that the interference signal can be removed from the received signal with accuracy by utilizing pieces of the information on the interference signal in different bands.

The benefit of the priority of the present application is claimed based on Japanese Patent Application No. 2014-042342 filed on Mar. 5, 2014 and all disclosures thereof are incorporated herein by reference in their entirety.

INDUSTRIAL APPLICABILITY

The present invention is favorable for the noise canceller device that is capable of removing the interference signals from other systems and improving the communication quality of the desired signal.

What is claimed is:

1. A noise canceller device comprising:
an interference signal composition section that performs cross-correlation processing in regard to a plurality of received interference signals having the same components and from different interference sources respectively and acquires information on the interference signals, and emphasizes an interference signal of one interference source by composing the plurality of received interference signals on the basis of the information concerned, and outputs an emphasized interference signal of the one interference source;

an interference signal replica generation section that performs processing of correlation between a received signal and the emphasized interference signal of the one interference source and acquires information on the interference signals included in the received signal, and generates an interference signal replica for each of the interference signals included in the received signal on the basis of the information concerned; and an interference signal removal unit that removes each of the interference signals by subtracting the corresponding interference signal replica from the received signal.

2. The noise canceller device of claim 1, wherein antennas adapted to receive the interference signals plurally are installed, and the antennas are a main-antenna and one or more sub-antennas.

3. The noise canceller device of claim 1, wherein antennas adapted to receive the interference signals plurally are installed, and the antennas are a plurality of sub-antennas.

4. The noise canceller device of claim 2, wherein at least one sub-antenna is made so as to have directivity to the interference signals.

5. The noise canceller device of claim 3, wherein at least one of the plurality of sub-antennas is made so as to have directivity to the interference signals.

6. A noise canceller device comprising:
two of the noise canceller devices of claim 1, wherein the respective noise canceller devices receive signals of mutually different bands, share pieces of information on interference signals in the interference signal composition section, and use the information that has been decided to be high in accuracy or the information that is large in received level in the pieces of acquired information on the interference signals.

7. A noise canceller device comprising:
a first noise canceller device of claim 1; and
a second noise canceller device comprising:
an interference signal composition section that performs self correlation processing in regard to a received signal and acquires information on a plurality of interference signals included in the received signal, and composes the plurality of interference signals included in the received signal on the basis of the information concerned, and outputs composed signal;
an interference signal replica generation section that performs processing of correlation between the received signal and the composed interference signal and acquires information on the interference signal included in the received signal, and generates an interference signal replica on the basis of the information concerned; and
an interference signal removal unit that removes the interference signal by subtracting the interference signal replica from the received signal, and
wherein the first and second noise canceller devices receive signals of mutually different bands, share pieces of information on interference signals in the interference signal composition section, and use the information that has been decided to be high in accuracy or the information that is large in received level in the pieces of acquired information on the interference signals.

8. A noise canceller device comprising:
an interference signal composition section that performs self correlation processing in regard to a received signal and acquires information on a plurality of interference signals included in the received signal having the same components and from different interference sources respectively, and emphasizes an interference signal of one interference source by composing the plurality of interference signals included in the received signal on the basis of the information concerned, and outputs an emphasized interference signal of the one interference source;

an interference signal replica generation section that performs processing of correlation between the received signal and the emphasized interference signal of the one interference source and acquires information on the interference signal included in the received signal, and generates an interference signal replica for each of the interference signals included in the received signal on the basis of the information concerned; and an interference signal removal unit that removes each of the interference signals by subtracting the corresponding interference signal replica from the received signal.

9. The noise canceller device of claim 8, wherein a main antenna to receive signals is installed, or a main-antenna and a sub-antenna to receive signals are installed.

10. A noise canceller device comprising:
two of the noise canceller devices of claim 8, wherein the respective noise canceller devices receive signals of mutually different bands, share pieces of information on interference signals in the interference signal composition section, and use the information that has been decided to be high in accuracy or the information that is large in received level in the pieces of acquired information on the interference signals.

* * * * *